United States Patent [19]

Harrington et al.

[11] Patent Number: 5,555,513

[45] Date of Patent: Sep. 10, 1996

[54] DATA PROCESSING SYSTEM HAVING A COMPENSATION CIRCUIT FOR COMPENSATING FOR CAPACITIVE COUPLING ON A BUS

[75] Inventors: Cheri L. Harrington; Michael E. Gladden, both of Austin, Tex.; Blaine M. Prestwich, Salt Lake City, Utah

[73] Assignee: Motorola Inc., Schaumburg, Ill.

[21] Appl. No.: 282,404

[22] Filed: Jul. 28, 1994

[51] Int. Cl.$^6$ .................................................. G06J 1/00
[52] U.S. Cl. ............................................................. 364/602
[58] Field of Search ............................. 364/602, 715.01; 307/105, 98; 327/427, 434, 436; 326/23, 27, 86

[56] References Cited

U.S. PATENT DOCUMENTS 4,703,198  10/1987  Porter et al. ............................ 326/86
4,994,690  2/1991  Sundstrom et al. .................... 326/86

*Primary Examiner*—Tan V. Mai
*Attorney, Agent, or Firm*—Daniel D. Hill

[57] ABSTRACT

A compensation circuit (64) for ensuring that a first conductor (60) of a plurality of parallel conductors (60, 61, 62) in a bus (50) remains at a logic high voltage when a second conductor (61) adjacent to the first conductor (60) transitions from a logic high voltage to a logic low voltage. The compensation circuit (64) senses when the voltage on the second conductor (61) is reduced from a logic high voltage to a logic low voltage, and causes the first conductor (60) to be coupled to a power supply voltage terminal to prevent a logic high voltage on the first conductor (60) from being reduced toward a logic low voltage due to a capacitive coupling between the first conductor (60) and the second conductor (61).

20 Claims, 2 Drawing Sheets

DATA PROCESSING SYSTEM HAVING A COMPENSATION CIRCUIT FOR COMPENSATING FOR CAPACITIVE COUPLING ON A BUS

FIELD OF THE INVENTION

This invention relates generally to data processing, and more particularly, to a compensation circuit for reducing capacitive coupling noise on a bus.

BACKGROUND OF THE INVENTION

In an integrated circuit data processing system, a bus is used to route instructions and data between various parts of the system. The bus generally includes a plurality of parallel, relatively long, metal lines, or conductors. Each of the metal lines of the bus may be subject to capacitive coupling from neighboring lines. For example, if a voltage on one of the metal lines is reduced from a logic high voltage to a logic low voltage, a logic high voltage on adjacent lines may also be reduced due to capacitive coupling between the lines. As the physical dimensions of a data bus are reduced (for example, due to additional shrinks), and the metal lines are spaced closer together, the capacitive coupling effect is increased.

A bus using a precharge/discharge scheme is especially vulnerable to capacitive coupling effects. In a precharge/discharge bus, the conductors are precharged to a logic high voltage, and weak holding latches are used to maintain the logic high voltage on the conductors. N-channel pull-down driver transistors are used to reduce the voltage on the conductors to a logic low voltage during assertion. The precharge/discharge scheme provides the advantage of high switching speeds for a high performance bus. However, a problem with using the weak holding latches is that they need to be weak enough to allow new data to overwrite old data. Data can be inadvertently overwritten by the capacitive coupling effect due to a non-active drive during a sampling phase of transmission.

Some commonly used busses have a bus structure that is continuously driven during the time the data is being sampled. A continuously driven bus has a driver circuit for changing the voltage level on a conductor, and for holding the conductor at the required logic state during sampling. A commonly used driver circuit has a totem-pole arrangement where the driver contains both P-channel and N-channel transistors. While the totem-pole driver circuit provides good noise immunity, the totem-pole driver adds additional loading to the conductors. This additional loading, compared to a precharge/discharge bus, reduces the switching speed of the continuously driven bus.

A solution to the capacitive coupling noise problem has been to shield each conductor of the bus. A shielded bus is effective for reducing coupling noise on a relatively long bus, but is less effective for shorter, or medium length busses. Also, the shielding requires a relatively large surface area on the integrated circuit to implement.

SUMMARY OF THE INVENTION

Accordingly, there is provided, in one form, a data processing system having a compensation circuit for compensating for a capacitive coupling between first and second conductors that are adjacent and substantially parallel to one another. The compensation circuit senses a transition of a voltage on the first conductor from a first voltage level to a second voltage level, and in response, prevents a voltage on the second conductor from being changed due to the capacitive coupling. These and other features and advantages will be more clearly understood from the following detailed description taken in conjunction with the accompanying drawings.

DESCRIPTION OF A PREFERRED EMBODIMENT

Generally, the present invention provides a compensation circuit for ensuring that a first conductor of a plurality of parallel conductors in a bus remains at a precharged logic high voltage when a second conductor adjacent to and substantially parallel to the first conductor transitions from a logic high voltage to an asserted logic low voltage. The compensation circuit senses when the voltage on the second conductor is reduced from a logic high voltage to a logic low voltage, and causes the first conductor to be coupled to a power supply voltage terminal to prevent a logic high voltage on the first conductor from being reduced toward a logic low voltage due to a capacitive coupling between the first conductor and the second conductor. The bus has a compensation circuit for each conductor of the bus. The compensation circuits of the bus dynamically control the capacitive coupling effect between adjacent conductors. For example, if the second conductor and a third conductor located on the other side of the first conductor both transition to a logic low voltage at the same time, compensation circuits coupled between the first conductor and the second and third conductors turn on, providing additional drive compensation to sustain a precharged logic high voltage of the first conductor.

Figure 1:
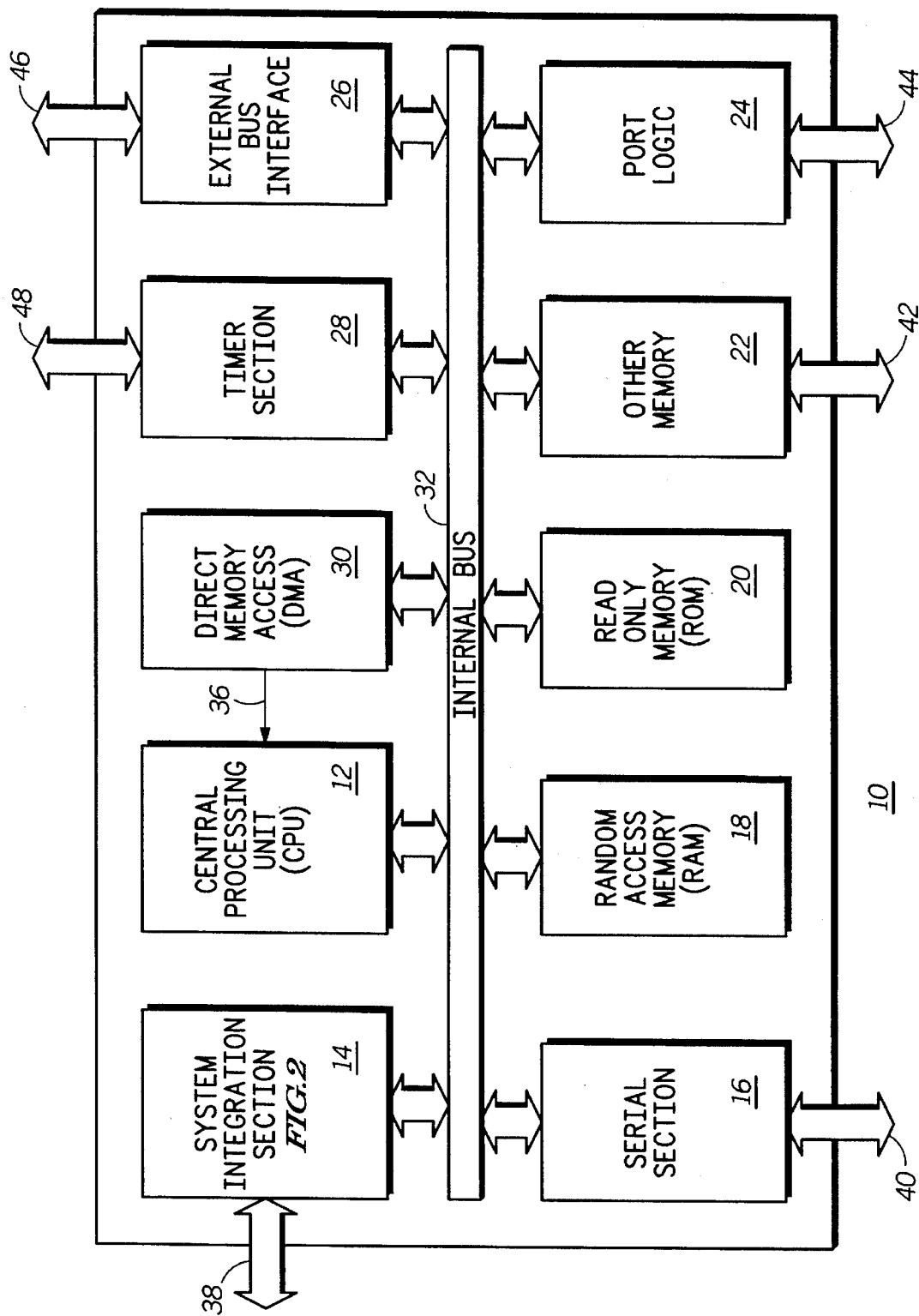
FIG. 1 illustrates in block diagram form, a data processing system in accordance with an embodiment of the present invention.

The present invention can be more fully described with reference to FIG. 1–3. FIG. 1 illustrates an embodiment of data processing system 10. Data processing system 10 has central processing unit (CPU) circuits 12, system integration section 14, serial section circuits 16, random access memory (RAM) 18, read only memory (ROM) 20, other memory circuits 22 (e.g. electrically erasable programmable read only memory, EEPROM), port logic circuitry 24, external bus interface circuits 26, timer section circuits 28, and direct memory access (DMA) circuits 30, each of which is bi-directionally coupled to internal bus circuits 32. CPU 12 is coupled to DMA 30 by way of bus circuits 36.

System integration section 14 can receive and transmit signals external to data processing system 10 by way of external bus circuits 38. Serial section 16 can receive and transmit signals external to data processing system 10 by way of external bus circuits 40. Depending upon the type of memory, other memory 22 may optionally receive and transmit signals external to data processing system 10 by way of external bus circuits 42. Port logic 24 can receive and transmit signals external to data processing system 10 by way of external bus circuits 44. External bus interface 26 can receive and transmit signals external to data processing system 10 by way of external bus circuits 46. And timer section 28 can receive and transmit signals external to data processing system 10 by way of external bus circuits 48. External bus circuits 38, 40, 42, 44, 46, and 48 may be coupled to integrated circuit pins, pads, or other types of terminals for transmitting and receiving signals.

Figure 2:
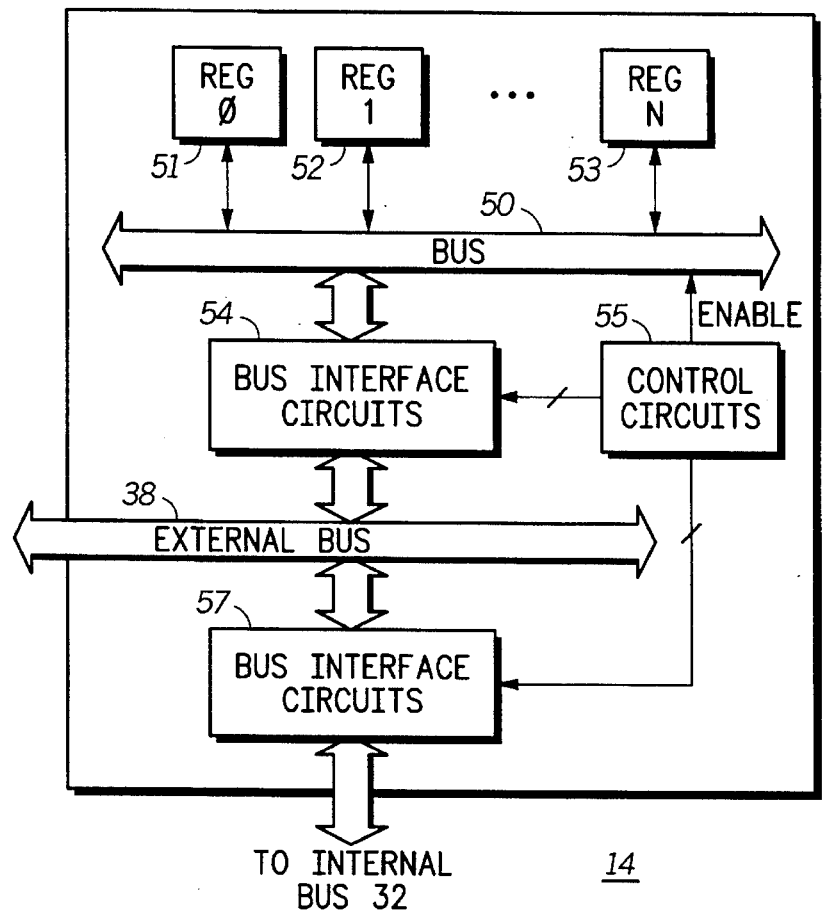
FIG. 2 illustrates in block diagram form, the system integration section of the data processing system of FIG. 1.

FIG. 2 illustrates in block diagram form, system integration section 14 of data processing system 10 of FIG. 1. System integration section 14 includes external bus 38, bus interface circuits 54 and 57, control circuits 55, bus 50, and registers 51, 52, and 53.

Registers 51, 52, and 53 represent a plurality of registers coupled to bus 50. The number or type of registers coupled to bus 50 is not important for purposes of describing the invention, and may be different in other embodiments. Also, in other embodiments, registers 51, 52, and 53 may be other types of circuits, and are not limited to registers. Bus interface circuits 54 facilitates an exchange of information between bus 50 and external bus 38. The information may comprise data, instructions, or control signals. Control circuits 55 provide control signals to bus interface circuits 54 and 57, and a control signal labeled "ENABLE" to bus 50. Bus interface circuits 57 facilitates an exchange of information between internal bus 32 and external bus 38. Bus 50 is a precharge/discharge bus.

Figure 3:
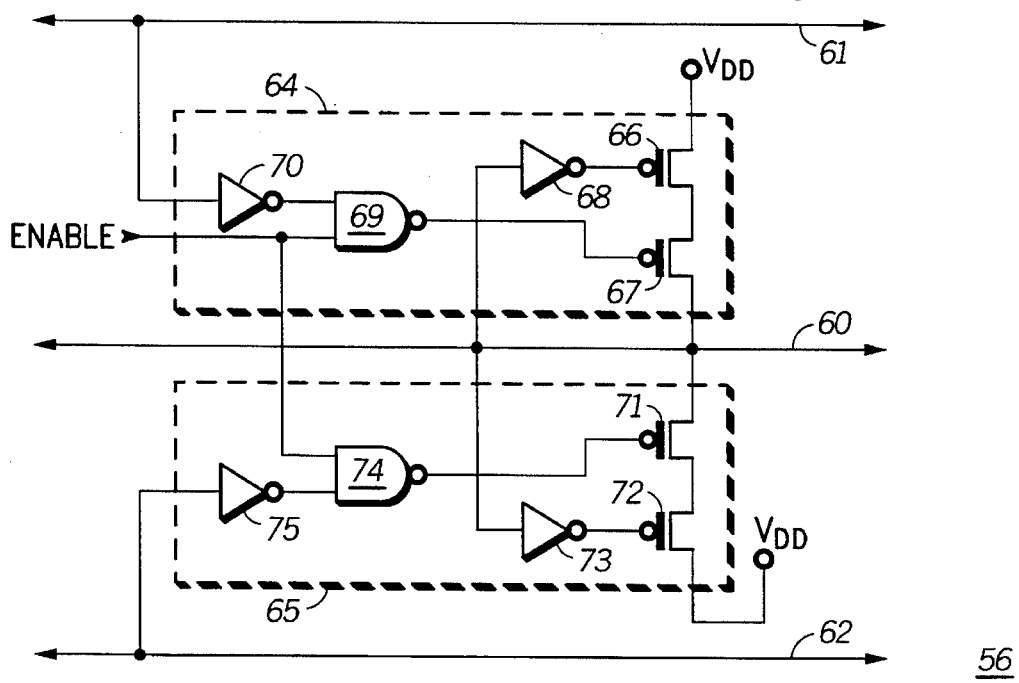
FIG. 3 illustrates in partial logic diagram form and partial schematic diagram form, a portion of a bus of the system integration section in accordance with the present invention.

FIG. 3 illustrates in partial logic diagram form and partial schematic diagram form, a bus portion 56 of bus 50 of FIG. 2 in accordance with an embodiment of the present invention. Bus portion 56 includes conductors 60, 61, and 62 and compensation circuits 64 and 65. Compensation circuit 64 includes P-channel transistors 66 and 67, inverters 68 and 70, and NAND logic gate 69. Compensation circuit 65 includes P-channel transistors 71 and 72, inverters 73 and 75, and NAND logic gate 74.

Conductors 60, 61, and 62 are adjacent, substantially parallel, conductors that are representative of a plurality of conductors comprising bus 50 (FIG. 2). Note that bus 50 may carry instructions or data, and the use of the word data herein can encompass both instructions or data. Compensation circuits 64 and 65 are coupled to conductor 60. Conductors 61 and 62 would each have a compensation circuit corresponding to each adjacent conductor (not illustrated).

In compensation circuit 64, P-channel transistor 66 has a source connected to a power supply voltage terminal labeled "$V_{DD}$", a gate, and a drain. P-channel transistor 67 has a source connected to the drain of P-channel transistor 66, a gate, and a drain connected to conductor 60. Inverter 68 has an input terminal connected to conductor 60, and an output terminal connected to the gate of P-channel transistor 66. NAND logic gate 69 has a first input terminal, a second input terminal for receiving control signal ENABLE, and an output terminal connected to the gate of P-channel transistor 67. Inverter 70 has an input terminal connected to conductor 61, and an output terminal connected to the first input terminal of NAND logic gate 69.

In compensation circuit 65, P-channel transistor 72 has a source connected to $V_{DD}$, a gate, and a drain. P-channel transistor 71 has a source connected to the drain of P-channel transistor 72, a gate, and a drain connected to conductor 60. Inverter 73 has an input terminal connected to conductor 60, and an output terminal connected to the gate of P-channel transistor 72. NAND logic gate 74 has a first input terminal for receiving control signal ENABLE, a second input terminal, and an output terminal connected to the gate of P-channel transistor 71. Inverter 75 has an input terminal connected to conductor 62, and an output terminal connected to the second input terminal of NAND logic gate 74.

Each conductor in bus 50 (FIG. 2) has a compensation circuit similar to compensation circuits 64 and 65 for preventing data loss due to capacitive coupling between adjacent conductors. If both of conductors 60 and 61 are at logic high voltages as a result of precharging, compensation circuit 64 functions to maintain conductor 60 at the logic high voltage if the voltage of conductor 61 swings from the logic high to a logic low. Likewise, compensation circuit 65 functions to maintain conductor 60 at a logic high voltage when the voltage on conductor 62 swings from a logic high to a logic low. There are generally two compensation circuits per conductor (except for the first and last conductor of a data bus, which would each only have one adjacent conductor).

Compensation circuits 64 and 65 sense the logic states of the two adjacent conductors 61 and 62 and the logic state of conductor 60 to determine whether to hold conductor 60 at its precharged state or to allow it to be discharged. When only one of adjacent conductors 61 or 62 transitions to a logic low voltage level, only one of compensation circuits 64 or 65 turns on. If both adjacent conductors 61 and 62 transition to a logic low voltage level, both compensation circuits 64 and 65 turn on to provide additional drive to prevent the corruption of data due to the capacitive coupling effect. If neither of conductors 61 or 62 transition to a logic low voltage level, compensations circuits 64 and 65 do not turn on to provide compensation.

As an example, assume that conductors 60 and 61 are both precharged to a logic high voltage. A logic low voltage is provided to P-channel transistor 66 through inverter 68, causing P-channel transistor 66 to be conductive. During a read cycle of one of registers 51, 52, or 53 (see FIG. 2), the logic high voltage on conductor 61 is reduced to a logic low voltage. Control signal ENABLE is a logic high voltage, and NAND logic gate 69 provides a logic low voltage to the gate of P-channel transistor 67. Because conductor 60 is at a logic high voltage, the gate of P-channel transistor 66 is at a logic low voltage. P-channel transistors 66 and 67 couple conductor 60 to $V_{DD}$, thus maintaining the logic high voltage of conductor 60.

Likewise, if conductors 60 and 62 are precharged to a logic high voltage, and the voltage on conductor 62 is reduced to a logic low voltage, compensation circuit 65 operates like compensation circuit 64 to maintain the logic high voltage of conductor 60. Control signal ENABLE is a logic high voltage and NAND logic gate 74 provides a logic low voltage to the gate of P-channel transistor 71. Because conductor 60 is a logic high voltage, the gate of P-channel transistor 72 is a logic low, and P-channel transistors 71 and 72 couple conductor 60 to $V_{DD}$.

In the case when both of conductors 61 and 62 transition to a logic low voltage at the same time, and control signal ENABLE is a logic high voltage, both compensation circuit 64 and 65 provide drive capability to prevent the voltage on conductor 60 from being reduced.

Compensation circuits 64 and 65 provide adequate noise immunity with minimal speed degradation relative to a precharge/discharge bus without compensation circuits 64 and 65. Even though bus 50 is a precharge/discharge bus, compensation circuits 64 and 65 are useful for any type of bus having long lines running in parallel that are susceptible to noise coupling from neighboring conductors. Compensation circuits 64 and 65 provide the noise immunity of a continuously driven bus, with performance near that of a precharge/discharge bus. As compared to shielding, compensation circuits 64 and 65 require less surface area. Also, compensation circuits 64 and 65 provide dynamic drive capability when one or more conductors transition to a logic low at the same time.

While the invention has been described in the context of a preferred embodiment, it will be apparent to those skilled in the art that the present invention may be modified in numerous ways and may assume many embodiments other than that specifically set out and described above. For example, compensation circuits 64 and 65 may be modified to preserve a logic low voltage on a conductor when adjacent conductors transition from a logic low voltage to a logic high voltage. Accordingly, it is intended by the appended claims to cover all modifications of the invention which fall within the true spirit and scope of the invention.

What is claimed is:

1. A data processing system having a compensation circuit for reducing capacitive coupling between a plurality of conductors arranged substantially parallel to one another, the compensation circuit comprising:

a first transistor having a first current electrode coupled to a power supply voltage terminal, a control electrode, and a second current electrode;

a second transistor having a first current electrode coupled to the second current electrode of the first transistor, a control electrode, and a second current electrode coupled to a first conductor;

a first inverter having an input terminal coupled to the first conductor, and an output terminal coupled to the control electrode of the first transistor;

a second inverter having an input terminal coupled to a second conductor, and an output terminal; and a logic gate having a first input terminal coupled to the output terminal of the second inverter, a second input terminal for receiving a control signal, and an output terminal coupled to the control electrode of the second transistor;

wherein the second conductor is positioned both adjacent and substantially parallel to the first conductor.

2. The data processing system of claim 1, wherein the logic gate is for performing a NAND logic function.

3. The data processing system of claim 1, wherein the first and second transistors are characterized as being P-channel transistors.

4. The data processing system of claim 1, wherein the first and second conductors comprise a portion of a bus.

5. A data processing system comprising a compensation circuit for compensating for a capacitive coupling between first and second conductors that are adjacent and substantially parallel to one another, the compensation circuit comprising sensing means for sensing a transition of a voltage on the first conductor from a first voltage level to a second voltage level, and in response to sensing the transition from the first voltage level to the second voltage level, enabling driving means, the driving means for preventing a voltage on the second conductor from being changed due to the capacitive coupling.

6. The data processing system of claim 5, wherein the compensation circuit comprises:

a first transistor having a first current electrode coupled to a power supply voltage terminal, a control electrode, and a second current electrode;

a second transistor having a first current electrode coupled to the second current electrode of the first transistor, a control electrode, and a second current electrode coupled to the second conductor;

a first inverter having an input terminal coupled to the second conductor, and an output terminal coupled to the control electrode of the first transistor;

a second inverter having an input terminal coupled to the first conductor, and an output terminal; and a logic gate having a first input terminal coupled to the output terminal of the second inverter, a second input terminal for receiving a control signal, and an output terminal coupled to the control electrode of the second transistor.

7. The data processing system of claim 6, wherein the logic gate is for performing a NAND logic function.

8. The data processing system of claim 6, wherein the first and second transistors are characterized as being P-channel transistors.

9. The data processing system of claim 6, wherein the first and second conductors comprise a portion of a bus.

10. A data processing system, comprising:

a bus having a plurality of conductors that are substantially parallel to one another; and a compensation circuit, coupled to the bus, the compensation circuit comprising:

a first transistor having a first current electrode coupled to a power supply voltage terminal, a control electrode, and a second current electrode;

a second transistor having a first current electrode coupled to the second current electrode of the first transistor, a control electrode, and a second current electrode coupled to a first conductor of the plurality of conductors;

a first inverter having an input terminal coupled to the first conductor, and an output terminal coupled to the control electrode of the first transistor;

a second inverter having an input terminal coupled to a second conductor of the plurality of conductors, and an output terminal; and a logic gate having a first input terminal coupled to the output terminal of the second inverter, a second input terminal for receiving a control signal, and an output terminal coupled to the control electrode of the second transistor.

11. The data processing system of claim 10, further comprising a second compensation circuit, coupled to the first conductor and to a third conductor, the third conductor positioned adjacent to the first conductor on a side opposite the second conductor.

12. The data processing system of claim 10, wherein the logic gate is for performing a NAND logic function.

13. The data processing system of claim 10, wherein the first and second transistors are characterized as being P-channel transistors.

14. A data processing system, comprising:

a plurality of conductors arranged substantially parallel to one another; and a compensation circuit, comprising:

a sense circuit, coupled to first and second conductors of the plurality of conductors, for sensing a transition of a first signal on the first conductor from a first voltage level to a second voltage level; and a drive circuit, coupled to the first and second conductors, for preventing a second signal on the second conductor from being changed by the transition of the first signal due to a capacitive coupling from the first conductor.

15. The data processing system of claim 14, wherein the sense circuit comprises a first transistor having a first current electrode, a control electrode electrically coupled to the first conductor, and a second current electrode coupled to the second conductor.

16. The data processing system of claim 15, wherein the drive circuit comprises a second transistor having a first current electrode coupled to a first power supply voltage terminal, a control electrode electrically coupled to the second conductor, and a second current electrode coupled to the first current electrode of the first transistor.

17. The data processing system of claim 14, further comprising a second compensation, the second compensation circuit coupled to the second conductor and to a third conductor of the plurality of conductors, the second compensation circuit for sensing a transition of a third signal on the third conductor from the first voltage level to the second voltage level, and in response, preventing the second signal on the second conductor from being changed by the transition of the third signal due to a capacitive coupling from the third conductor.

18. The data processing system of claim 17, wherein the second compensation circuit comprises:

a first transistor having a first current electrode coupled to a first power supply voltage terminal, a control electrode electrically coupled to the second conductor, and a second current electrode; and a second transistor having a first current electrode coupled to the second current electrode of the first transistor, a control electrode electrically coupled to the third conductor, and a second current electrode coupled to the second conductor.

19. The data processing system of claim 17, wherein the first and third conductors are each adjacent to the second conductor, and the plurality of conductors comprise an information bus of the data processing system.

20. The data processing system of claim 19, wherein the information bus is characterized as being a precharge/discharge bus.

* * * * *